US010404909B1

(12) United States Patent
Rosenblatt et al.

(10) Patent No.: US 10,404,909 B1
(45) Date of Patent: Sep. 3, 2019

(54) MEASUREMENTS VIA VEHICLE SENSORS

(71) Applicant: Ford Global Technologies, LLC, Dearborn, MI (US)

(72) Inventors: Danielle Rosenblatt, Dearborn, MI (US); Hamid M. Golgiri, Dearborn, MI (US); Anthony Melatti, Dearborn, MI (US); Patrick Lawrence Jackson Van Hoecke, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/955,892

(22) Filed: Apr. 18, 2018

(51) Int. Cl.
| H04N 7/18 | (2006.01) |
| G06T 7/13 | (2017.01) |
| G06F 3/041 | (2006.01) |
| G01C 21/36 | (2006.01) |
| H04N 5/232 | (2006.01) |
| G01S 13/86 | (2006.01) |

(52) U.S. Cl.
CPC ......... *H04N 5/23229* (2013.01); *G01C 21/36* (2013.01); *G01S 13/865* (2013.01); *G01S 13/867* (2013.01); *G06F 3/0412* (2013.01); *G06F 3/0416* (2013.01); *G06T 7/13* (2017.01); *H04N 5/23206* (2013.01); *H04N 7/18* (2013.01); *B60K 2370/143* (2019.05); *B60R 2300/8086* (2013.01)

(58) Field of Classification Search
None
See application file for complete search history.

(56) References Cited

U.S. PATENT DOCUMENTS

| 7,590,261 B1* | 9/2009 | Mariano | G06K 9/00785 |
| | | | 382/103 |
| 9,691,152 B1* | 6/2017 | Borenstein | H04N 5/23219 |
| 9,895,945 B2* | 2/2018 | Lavoie | B60T 7/20 |
| 2002/0042668 A1* | 4/2002 | Shirato | G06K 9/00798 |
| | | | 701/1 |
| 2005/0232469 A1* | 10/2005 | Schofield | G06K 9/00818 |
| | | | 382/104 |
| 2011/0267184 A1* | 11/2011 | Lee | B60Q 9/005 |
| | | | 340/435 |
| 2014/0290199 A1* | 10/2014 | Herman | A01D 43/073 |
| | | | 56/10.2 R |
| 2014/0309870 A1* | 10/2014 | Ricci | H04W 4/21 |
| | | | 701/36 |
| 2016/0132126 A1* | 5/2016 | van Laack | G06F 3/0304 |
| | | | 345/156 |
| 2016/0288833 A1* | 10/2016 | Heimberger | B62D 15/027 |

(Continued)

FOREIGN PATENT DOCUMENTS

| DE | 200510008874 A1 * | 9/2006 | ............... G08G 1/16 |
| DE | 102010051204 A1 * | 5/2012 | ............... G08G 1/16 |

OTHER PUBLICATIONS

App Store, EasyMeausre, Caramba App Development, 2 pages.
App Store, VisualRuler, altaibayar tseveenbayar, 3 pages.

*Primary Examiner* — Reza Aghevli
(74) *Attorney, Agent, or Firm* — Brooks Kushman P.C.

(57) ABSTRACT

A system for a vehicle comprises a camera configured to capture an image of a forward path of the vehicle; a screen configured to display the image; and a processor, configured to, responsive to an input to the screen identify two edges of at least one object of the image, measure a first distance between the two edges and output the first distance.

15 Claims, 4 Drawing Sheets

(56) References Cited

U.S. PATENT DOCUMENTS

2017/0054946 A1* 2/2017 Lee .......................... B60R 1/00
2017/0177952 A1   6/2017 Nakamura
2017/0287217 A1* 10/2017 Kim ........................ B62J 27/00
2018/0312022 A1* 11/2018 Mattern ............. B62D 15/0285

* cited by examiner

MEASUREMENTS VIA VEHICLE SENSORS

TECHNICAL FIELD

The present disclosure is generally related to distance measuring system. More specifically, the present disclosure is related to a system for a vehicle user to measure a distance between two objects.

BACKGROUND

When a vehicle is operated in a tight space, the driver or operator of the vehicle may be unable to tell if the vehicle will fit. For instance, when a vehicle drives toward a narrow alleyway, the driver may be unable to identify whether the alleyway is wide enough for the vehicle to safely pass through. Oftentimes, the driver will have to get out of the vehicle to further evaluate the situation, which is inconvenient. Similar situations also include operating the vehicle in a tight parking lot or along a road with close obstacles.

SUMMARY

In one or more illustrative embodiments, a system for a vehicle comprises a camera configured to capture an image of a forward path of the vehicle; a screen configured to display the image; and a processor, configured to, responsive to an input to the screen identify two edges of at least one object of the image, measure a first distance between the two edges and output the first distance.

In one or more illustrative embodiments, a method comprises identifying two edges of at least one object displayed on an image captured by a camera responsive to an input; measuring a first depth between the camera and the at least one object; and calculating a first distance between the two edges using the first depth through image processing.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle system for measuring a distance between two edges. More specifically, the present disclosure proposes a system that enables a vehicle user/occupant to select two edges visualized on a display and measure the distance between the two edges. Further aspects of the disclosure are discussed in detail herein.

Figure 1:
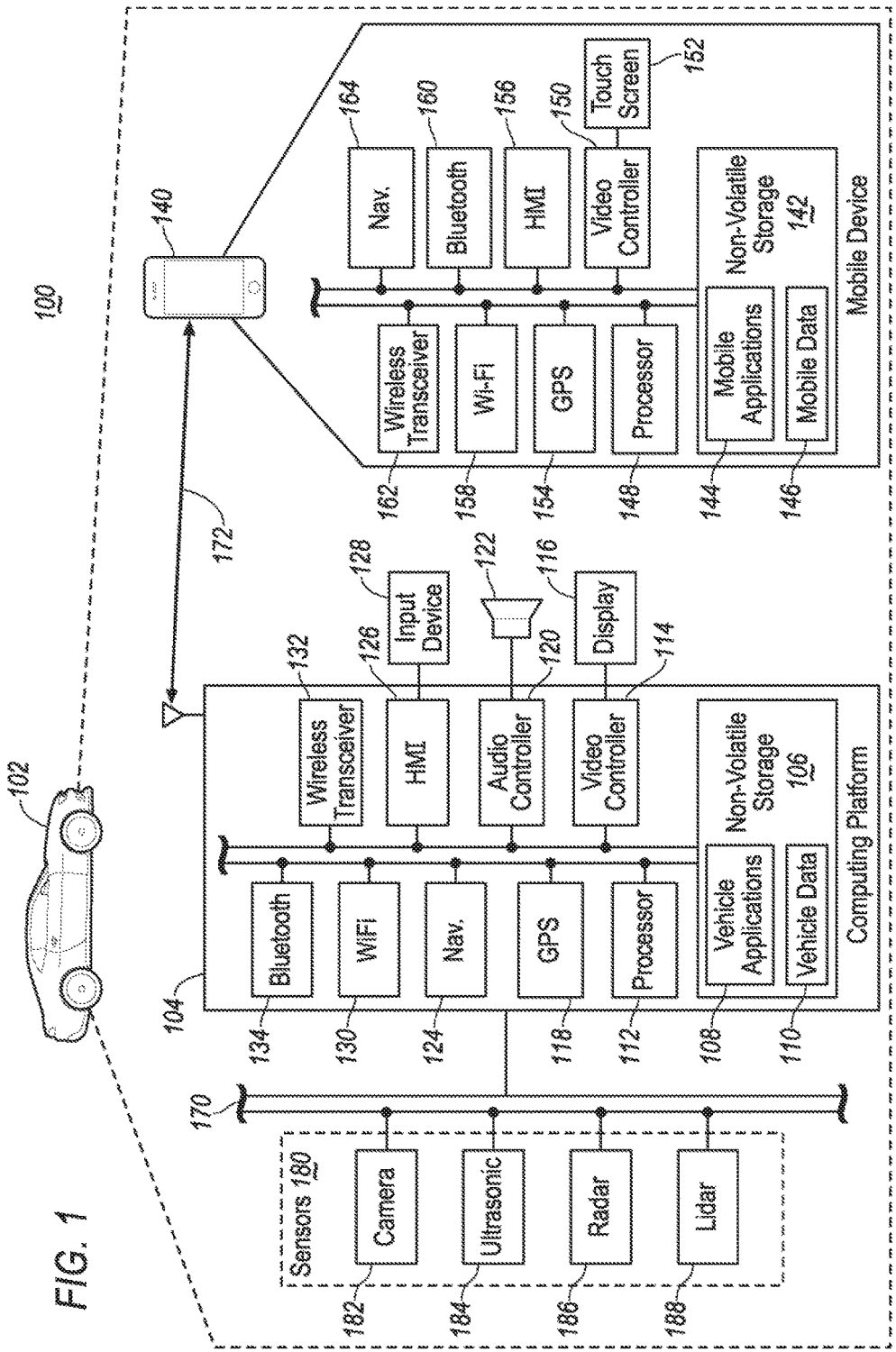
FIG. 1 illustrates an example block topology of a vehicle system of one embodiment of the present disclosure.

Referring to FIG. 1, an example block topology of a vehicle system 100 of one embodiment of the present disclosure is illustrated. Vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. The vehicle 102 may include a telematics system or other computing platform 104, such as the SYNC system manufactured by The Ford Motor Company of Dearborn, Mich. It should be noted that the illustrated system 100 is merely an example, and more, fewer, and/or differently located elements may be used.

As illustrated in FIG. 1, the computing platform 104 may include one or more processors 112 configured to perform instructions, commands, and other routines in support of the processes described herein. For instance, the computing platform 104 may be configured to execute instructions of vehicle applications 108 to provide features such as navigation, satellite radio decoding, and image processing. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from an input device 128 by way of a human-machine interface (HMI) controls 126 configured to provide for occupant interaction with the vehicle 102. As an example, the input device 128 may include one or more buttons, a touch pad, a rotary knob, a touch screen or other hardware with input capability configured to invoke functions on the computing platform 104 via the HMI controls 126.

The computing platform 104 may also drive or otherwise communicate with one or more displays 116 configured to provide visual output to vehicle occupants by way of a video controller 114. In some cases, the display 116 may be integrated with the input device 128 as a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning functions through a navigation controller 124 configured to plan navigation routes responsive to user input via e.g. the HMI controls 126, and output planned routes and instructions via the speaker 122 and the display 116. Location data that is needed for navigation may be collected from a global positioning system (GPS) controller 124 configured to communicate with multiple GPS satellites and calculate the location of the vehicle 102. Navigation software may be stored in the storage 106 as a part of the vehicle applications 108. Map data used for route planning may be stored in the storage 106 as a part of the vehicle data 110. For instance, the map data may include condition of a particular street, such as the length and width of an alleyway.

The computing platform 104 may be further configured to communicate with various sensors 180 via one or more in-vehicle network 170. The in-vehicle network 170 may include, but is not limited to, one or more of a controller area network (CAN), an Ethernet network, and a media oriented system transport (MOST), as some examples.

The sensors 180 may include a camera 182 configured to capture images near the vehicle 102. As an example, the camera 182 may be located behind the windshield of the vehicle 102 facing forward to capture an image in front of the vehicle 102. Alternatively, the front-facing camera 182 may be installed elsewhere, such as on the grille or inside the engine bay of the vehicle 102. Additionally or alternatively, the camera 182 may be located at the back of the vehicle 102 to function as a backup camera. The camera 182 may be configured to switch on automatically, e.g., responsive to the start/activation of the vehicle 102. Alternatively, the camera 182 may be manually switched on/off using the input device 128 by way of the HMI controls 126. The image data captured by the camera 182 may be fed into the computing platform 104 via the in-vehicle network 170 and displayed on the display 116 via the video controller 114, allowing the user/occupant to see objects in front of and/or behind the vehicle 102.

The sensors 180 may further include an ultrasonic sensor 184, a radar sensor 186, and a lidar sensor 188, all of which are configured to detect and measure objects near the vehicle 102. Details of those sensors will be described below.

The computing platform 104 may be configured to communicate with a mobile device 140 of the vehicle occupants/users via a wireless connection 172. Alternatively, the mobile device 1440 may be connected to the computing platform 104 via a wired connection (not shown). The mobile device 140 may be any of various types of portable computing device, such as cellular phones, tablet computers, smart watches, laptop computers, portable music players, or other device capable of communication with the computing platform 104. In many examples, the computing platform 104 may include a wireless transceiver 132 in communication with a Wi-Fi controller 130, a Bluetooth controller 134, and other controllers such as a Zigbee transceiver, an IrDA transceiver, an RFID transceiver (not shown), configured to communicate with a compatible wireless transceiver 162 of the mobile device 140.

The mobile device 140 may be provided with a processor 148 configured to perform instructions, commands, and other routines in support of the processes such as navigation, calling, wireless communication, and multi-media processing. For instance, the processor 148 may be configured to execute instructions of mobile applications 144 to provide the above features and functions.

The mobile device 140 may be provided with a wireless transceiver 162 in communication with a Wi-Fi controller 158, a Bluetooth controller 160, and other communication controllers (not shown), configured to communicate with the wireless transceiver 132 of the computing platform 104 via a wireless connection 172. Alternatively, the mobile device 140 may be connected to the computing platform 104 via a wired connection (not shown).

The mobile device 140 may be provided with various features allowing the users to interface with the mobile device 140. For example, the mobile device 140 may receive input from HMI controls 156 configured to provide for user interaction with the mobile device 140. For instance, the mobile device 140 may be configured to interface with a touch screen 152 via a video controller 150 to provide interactions with the user.

The mobile device 140 may also be provided with navigation and route planning functions through a navigation controller 164 configured to plan navigation routes responsive to user input via e.g. the touch screen 152 by way of the HMI controls 156, and output planned routes and instructions via the display touch screen 152. Location data needed for navigation may be collected from a GPS controller 154 configured to communicate with multiple GPS satellites and calculate the location of the mobile device 140. Navigation software may be stored in the storage 142 as a part of the mobile applications 144. Map data used for route planning may be stored in the storage 142 as a part of the mobile data 146. For instance, the map data may include a condition of a particular street to be traversed by the vehicle 102, the condition including information such as the length and width of an alleyway.

Figure 2:
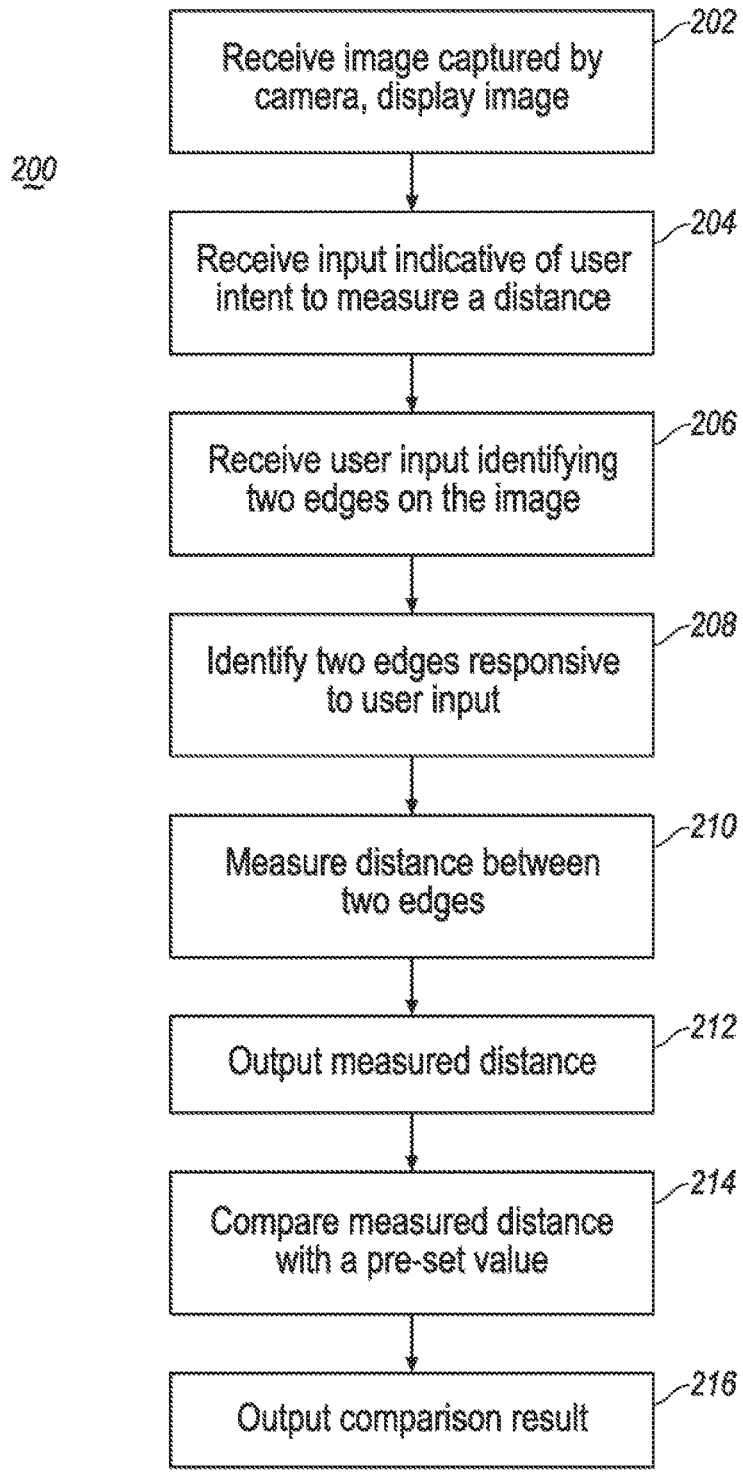
FIG. 2 illustrates an example flow diagram of one embodiment of the present disclosure.

FIG. 2 illustrates an example flow diagram 200 of one embodiment of the present disclosure. At operation 202, the computing platform 104 receives an image captured by the camera 182 via the in-vehicle network 170, and displays the image on the display 116 by way of the video controller 114. As an example, the camera 182 may be a front-facing camera configured to capture image video at a specific frame rate (e.g. 30 fps) and output the video to the computing platform 104 in a real-time manner for displaying. Additionally or alternatively, the computing platform 104 may be configured to output the image video to the mobile device 140 via the wireless connection 172 for displaying. Additionally, the image video captured by the camera 182 may be stored in the storage 106 of the computing platform 104 and/or the storage 142 of the mobile device 140 for a predefined length of time for future references.

At operation 204, the computing platform 104 receives an input indicative of a user's intent to measure a distance on the image displayed on the display 116. The user input may be received from the input device 128 via the HMI controls 126. As an example, the display 116 may be integrated with touch screen capability, and the user may utilize the touch capability to perform the input, such as by pressing an icon displayed on the touch screen. Additionally or alternatively, if the user prefers, he/she may perform the input using the touch screen 152 of the mobile device connected to the computing platform 104 via the wireless connection 172.

At operation 206, the computing platform receives input identifying two edges between which the user wants to measure the distance. For instance, the input may be received from the display 116 integrated with touch screen capability. Details of operation 206 will be discussed with reference to FIGS. 3 and 4 below. As a general example, the computing platform 104 may be configured to invite the user to tap on the two edges he/she wants to measure, and identify the two edges responsive to the user input at operation 208. For instance, the two edges may be identified using image processing algorithms. Additionally or alternatively, the computing platform may use signals received from other sensors 180 to identify the two edges that the user intends to select.

At operation 210, the computing platform 104 measures the distance between the two edges. Details of operation 210 will be discusses with reference to FIGS. 3 and 4 below. As a general example, the computing platform 104 may be configured to determine the distance of the two edges by analyzing the image the camera 182 captured using image processing algorithms stored as a part of the vehicle application 108. The image processing algorithms may be configured to perform edge detection using various characteristics of the image, such as one or more of discontinuities in depth, discontinuities in surface orientation, changes in material properties and variations in scene illumination in an image. Edge detection algorithms may include search-based approaches using first-order derivative expressions from the image or zero-crossing based approaches using second-order derivative expressions computed from the image. Additionally or alternatively, the computing platform may use signals received from other sensors 180 to measure the distance between the identified two edges. Additionally, if the computing platform 104 determines that the user intends to measure the width of an alleyway and the data of such alleyway is available as a part of the map data 110 stored in the storage 106, such data may be used to provide the width information to the user.

At operation 212, the computing platform 104 outputs the measurement distance. For instance, the computing platform 104 may be configured to output the measured distance using the display 116 by way of the video controller 114 and/or the speaker 122 by way of the audio controller 120. Additionally or alternatively, the computing platform 104 may be configured to send the measured distance to the mobile device 140 to output.

At operation 214, the computing platform 104 compares the measured distance with a preset value, such as the width of the vehicle 102, to determine whether it is safe to drive through between the two identified edges, such as a narrow alleyway. At operation 216, the computing platform 104 outputs the comparison result to inform the user of the vehicle 102.

The operation of the process 200 may be applied to various situations. In on example, the vehicle 102 arrives before a narrow alleyway and the user is not sure whether the alleyway is wide enough for the vehicle 102 to pass through. The camera 182 is activated and captures the image of the alleyway in front of the vehicle 102. The image is transmitted to the computing platform 104 for displaying on the display 116. Seeing the image of the alleyway being displayed on the display 116, the user inputs into the computing platform 104 by way of the HMI controls 126 to start measuring the width of the alleyway to determine if the vehicle 102 can drive through. In response, the computing platform 104 launches the measurement software as a part of the vehicle application 108 stored in the storage 106. If the vehicle 102 is equipped with other sensors 180, such as the ultrasonic sensor 184, the radar sensor 186, and/or the lidar sensor 188, the computing platform 104 further activates those sensors to collect additional data.

Next the user selects the two edges that define the width of the of the alleyway to measure. Although the computing platform 104 may be configured to automatically identify the edges of the alleyway and measure the width, for better identification and more accurate measurement, the computing platform 104 may invite the user to do it manually via the HMI controls 126. For example, a message such as "Please tap two edges on the screen to measure." may be displayed on the display 116 or broadcasted via the speaker 122 provided the display 116 has touch screen capability. Following the instruction, the user may tap on the left and right edges of the alleyway. Here, although it is possible for the computing platform to identify the edges on a moving video while vehicle 102 is still in motion, for the best identification and measurement results, the vehicle 102 is preferably stopped and the input is made onto a stationary image. Alternatively, the image may be transmitted into a mobile device 140 of the user via the wireless connection 172, allowing the user to select the edges on the touch screen 152 of the mobile device 140. In many cases, because the touch screen 152 on the mobile device 140 is more sensitive and accurate than the display 116 of the computing platform 104, this configuration may be advantageous as the user may more accurately select and identify the two edges.

In order to identify and measure the distance between the two edges of the alleyway, the computing platform 104 may analyze the image to identify the two edges to be measured, and calculate a distance between the two edges using image processing software stored in the storage 106 as a part of the vehicle application 108. Although this configuration is simple and no other sensors except for the camera 182 are required, the utilization of other sensors 180 may improve the accuracy of the measurement and calculation.

For instance, the vehicle 102 may be equipped with one or more ultrasonic sensors 184 installed in front of the vehicle 102 (e.g. on the front bumper) configured to detect objects within their range and calculate the distance from the objects. The utilization of ultrasonic sensors 184 may greatly improve the accuracy of the distance measurement in addition to the image captured by the camera 182. However, the ultrasonic sensors usually require the objects to be detected (e.g. the edges) are fairly close (e.g. within 15 feet), and that there are no other obstacles between the ultrasonic sensors 184 and the object. In practice, the computer platform 104 may be configured to first use the image captured by the camera 182 to determine an approximate distance between the vehicle 102 and the object. If the range is within the range of the ultrasonic sensors 184, the computing platform 104 may activate the sensors 184 for further assessment. In case of multiple ultrasonic sensors 184, each one of the sensors 184 may be given a field of view in relation to the image giving the computing platform 104 a better assessment of the distance.

Additionally or alternatively, the vehicle 102 may be equipped with a radar sensor 186 in the front. In general, the radar sensor 186 has a longer range than the ultrasonic sensors 184. However, the radar sensor usually requires the object to be detected to be metal. This may not be very helpful for the narrow alleyway example as the street and wall edges are usually not made of metal. However, the radar sensor may be useful to detect metal objects. For instance, the radar sensors 186 may be used to determine the width of a narrow parking space between two vehicles as the vehicles are made of metal.

Additionally or alternatively, the vehicle 102 may be equipped with a lidar sensor 188. The lidar sensor 188 functions much like the radar sensor 186 but removes the requirement for the object to be metal, which offers one of the best solution. However, lidar sensors in general are expensive and increases the cost of the system.

Figure 3:
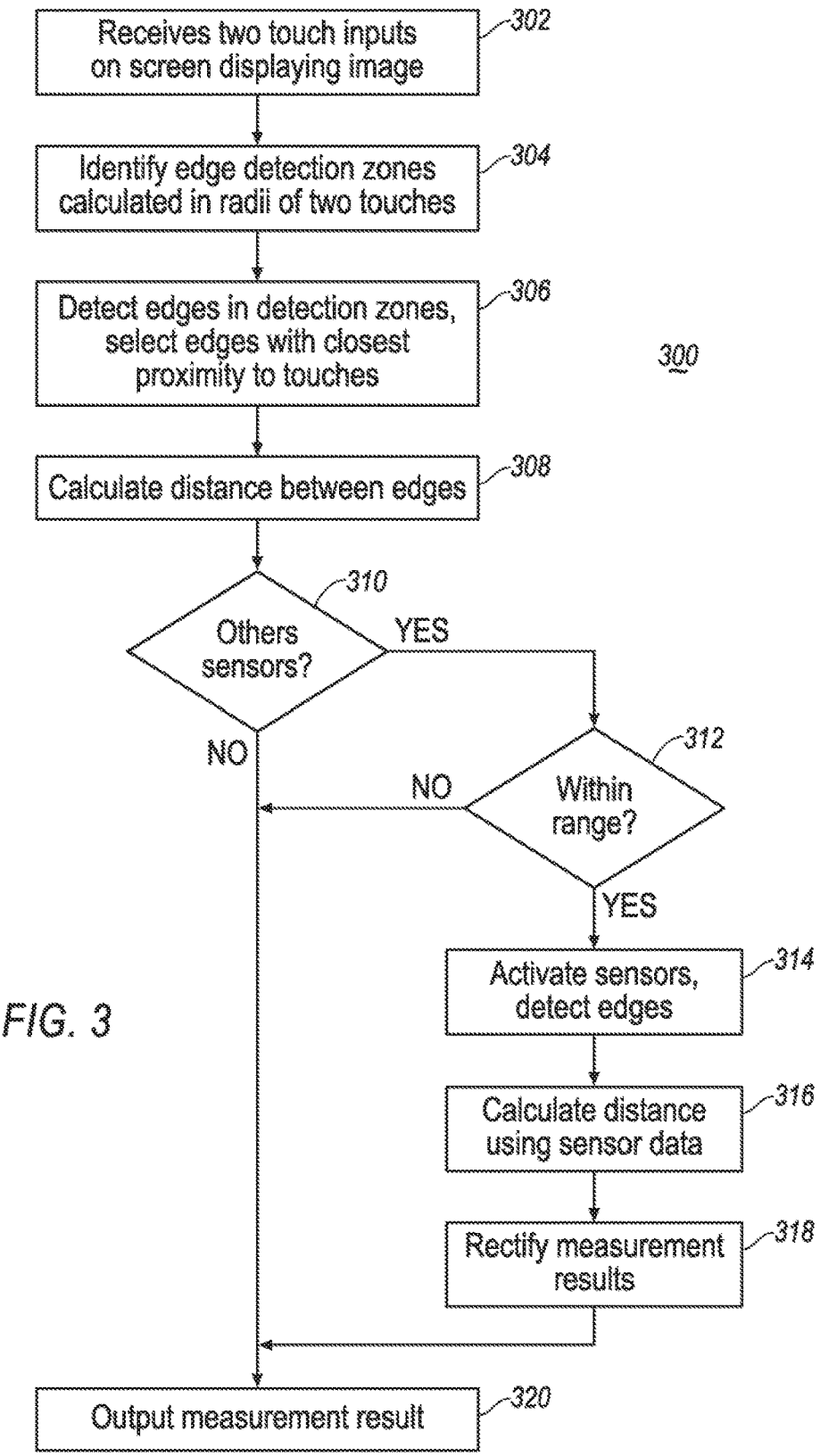
FIG. 3 illustrates an example flow diagram for edge detection and distance measurement of one embodiment of the present disclosure.
Figure 4:
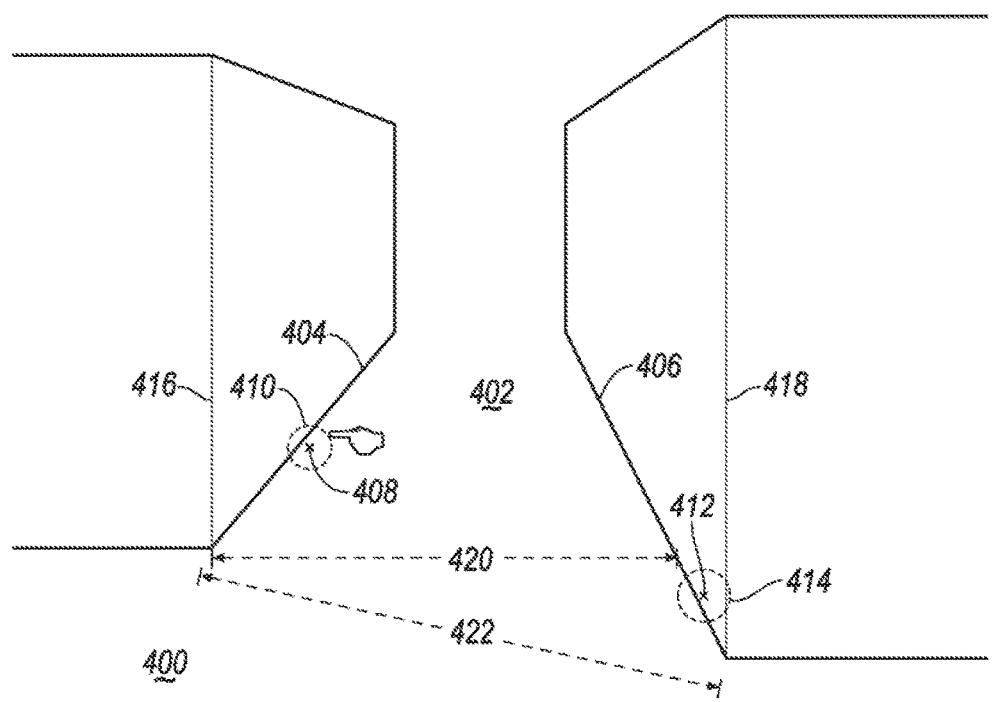
FIG. 4 illustrates an example image diagram of one embodiment of the present disclosure.

Referring to FIG. 3, a flow diagram 300 of the process for edge detection and distance measurement of one embodiment of the present disclosure is illustrated. The description of FIG. 3 will be made with reference to FIG. 4 which illustrates an example image 400 captured by the camera 182. In this example, the user of the vehicle 102 intends to measure the width of the alleyway 402 defined between a left edge 404 and a right edge 406.

At operation 302, the computing platform 104 receives two touch inputs 408, 414 on the display 116 which is provided with touch screen capability while displaying the image 400. As illustrated with reference to FIG. 4, the first touch input 408 is in a close proximity to the left edge 404, and the second touch input 412 is in a close proximity to the right edge 406. At operation 304, the computing platform 104 identifies two edge detection zones near the location of the two touch inputs 408 and 412. As an example, the zones may be calculated in a circle centered around the two touch input locations 408, 412 within a specific preset number of pixels radii (e.g. 200 pixels radii). As illustrated with reference to FIG. 4, a first circular edge detection zone 410 is identified centered around the first touch input 408 with a 200 pixels radius; a second circular edge detection zone 414 is identified centered around the second touch input 412 with a 200 pixels radius. It is noted that the shape and size of the edge detection zone described herein is merely an example and other shapes and sizes may be used. Additionally or alternatively, operation 302 may be performed via the touch screen 152 of the mobile device 140 wirelessly connected to the computing platform 104. Due to the screen resolution difference between the display 116 and the touch screen 152, the edge detection zones may have different sizes depending on which device the touch inputs 408, 412 are made to. For instance, if the edge detection zone having 200 pixels radius is used for the display 116 having a resolution of 1200×800, a 400 pixels radius may be used for the touch screen 152 having a resolution of 2400×1600 to include a substantially the same area on the image.

At operation 306, the computing platform 104 launches the image processing program stored in the storage 106 as a part of the vehicle application 108 to detect any edges inside the edge detection zones 410, 414 identified at operation 304. As a few non-limiting examples, edge detection algorithms used at operation 306 may include: Sobel, Canny, Prewitt, Roberts, or fuzzy logic methods. The computing platform 104 select an edge detected in the edge detection zone. For instance, referring to FIG. 4, there is only one edge 404 detected in the first edge detection zone 410 and the edge 404 is selected. However, for the second edge detection zone 414, the computing platform 104 detects both a horizontal edge 406 and a vertical edge 418. In this case, the computing platform 104 may be configured to select the one with the closest proximity to the touch input 414, and in this case the horizontal edge 406 is selected. This will lead to the correct selection result because the user intends to measure the distance 420 between the left horizontal edge 404 and the right horizontal edge 406 which define the width 420 of the alleyway 402. However, in case that the user touched the screen less accurately and the location of the touch input 412 is closer to the vertical edge 418, the vertical edge 418 will be selected instead of the horizontal edge 406 under this configuration. This will lead to a measurement for a wrong distance 422. There are a few ways to avoid this. As an example, the edges to be measured may be highlighted on the image 400. The user seeing the wrong edges are selected, may decide to reselect the two edges more carefully. Alternatively, the computing platform 104 may be configured to select the horizontal edges in default as in most cases the edges to be measured are horizontal. Alternatively, the computing platform 104 may be configured to match the orientation of the two edges to be the same. Taking the example illustrated in FIG. 4 for instance, since the left edge 404 detected in the first detection zone 410 is horizontal, the computing platform 104 may select the horizontal right edge 406 detected in the second detection zone 414 to match the orientation of the left edge 404.

At operation 308, the computing platform 104 calculates the distance 420 between the left edge 404 and the right edge 406 using image processing software stored in the storage 106 as part of the vehicle applications 108. Although various algorithms may be used for measuring the distance 420, the general principle is the computing platform 104 first determines a depth distance between the camera 182 and the object edges 404, 406 to be measured. Next, the computing platform 104 translate the pixel dimensions between the edges 404, 406 on the image 400 into an actual distance using preset configurations and algorithms.

At operation 310, the computing platform 104 detects whether the vehicle 102 is equipped with sensors 180 other than the camera 182. If the result is no, the process proceeds to operation 320 and the computing platform 104 outputs the measurement result which is the width 420 of the alleyway 402. The computing platform 104 may output the measurement result via the display 116 by interposing a segment representative of the distance 420 with the length next to it. Additionally or alternatively, the computing platform 104 may audibly output the measurement result via the speaker 122.

If there are other sensors 180 available, the process proceeds to operation 312 and computing platform 104 further determines whether the edges to be measured are within the range of the sensors 180. As discussed previously, different sensors may have different ranges. If the computing platform 104 determines that the edge to be detected is within the range of the sensors 180, the process proceeds to operation 314. It is noted that the camera 182 and other sensors 180 may be installed at different areas of the vehicle 102. For instance, the camera 182 may be installed on the windshield and the ultrasonic sensors 184 may be installed nears the front engine grille. In this case, the ultrasonic sensors 184 is closer to the edges to be detected than camera 182. The offset distances between the camera 182 and the ultrasonic sensors 184 may be preconfigured into the computing platform 104 and taken into account at operation 312.

At operation 314, the computing platform 104 activates the sensors 180 to detect the edges 404, 406. At operation 316, the computing platform 104 calculates the distance 420 between the left edge 404 and the right edge 406. Due to the fact the accuracy of different sensors may vary, the computing platform 104 may obtain different results for the measurement. Therefore, at operation 318, the computing platform 104 rectifies the measurement results calculated using data from the camera 182 and other sensors 180. As an example, the computing platform 104 may use the average of the multiple measurements as the final result. Alternatively, the computing platform 104 may give more weight to more accurate sensors (e.g. the lidar sensor 188) during the rectification operation 318. At operation 320, the computing platform 104 outputs the rectified measurement result.

It is noted that, the process 400 performed by the computing platform 104 discussed above may also be completely or partially performed by the mobile device 140 using the mobile application 144 stored in the storage 142. Data that is necessary to perform the above operations may be wirelessly communicated between the computing platform 104 and the mobile device 140 via the wireless connection 172.

Figure 5:
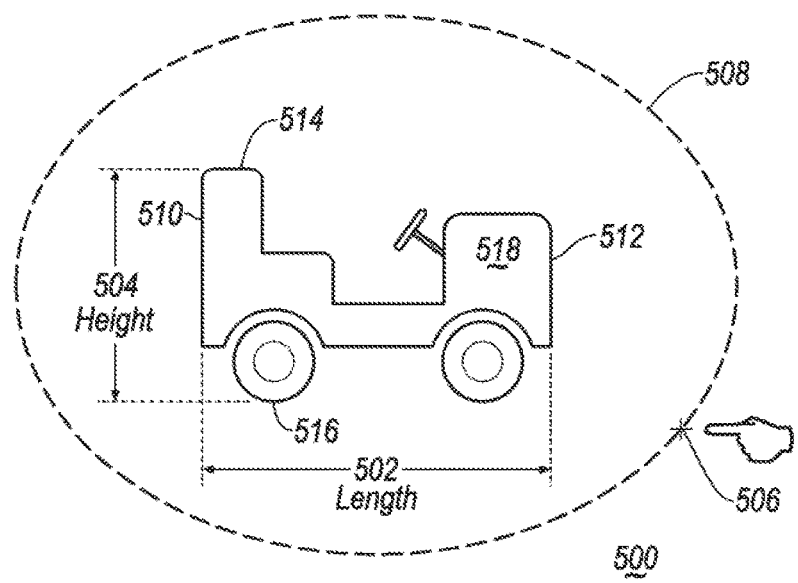
FIG. 5 illustrates an example image diagram of another embodiment of the present disclosure.

Referring to FIG. 5, another embodiment of the measurement system of the present disclosure is illustrated. Different from the example illustrated with reference to FIGS. 3 and 4, in the present example the computing platform 104 measures the dimension of an object 518. As illustrated in FIG. 5, the object 518, which is a tractor, appears in the image 500 captured by the camera 182 of the vehicle 102. In this example, the user of the vehicle 102 intends to measure the length 502 and the height 504 of the object 518.

First, the computing platform 104 may be configured to invite the user to identify two measuring edges by receiving touch inputs on the display 116. For instance, similar to operations 302 and 304 as illustrated in FIG. 3, the user may make touch inputs near the edge 514 and the edge 516 to identify the two edges he/she intends to measure. It is noted that the edges to be identified do not have to be the outermost and the user may measure a distance using inner edges. Alternatively, the computing platform 104 may be configured to identify the measuring edges by receiving a user input on the display 116 starting from location 506 drawing an enclosure 508 and finishing at substantially the same location as the starting point 506. The enclosure 508 defines an object detection zone (hereinafter the object detection zone 508). Next, the computing platform 104 detects if there is any object within the object detection zone 508 using image processing algorithms substantially the same as in operation 306 illustrated in FIG. 3. It is noted that in reality there may be some background image (not shown) that is also enclosed inside the object detection zone 158 and the background image may produce image noise and affect the accuracy of the object detection. The image noise may be filter using image filtering algorithms such as Gaussian blur, Han filter, median filter, morphological operations, spatial filter, or temporal filter as a few non-limiting examples. Additionally, if the vehicle 102 is equipped with other sensors 180, the computing platform 104 may also use those sensors to further identify the object 518.

Once the object 518 is identified, the following process is substantially the same as operations 306-320 illustrated with reference to FIG. 3. In essence, the computing platform 104 identifies the outmost edges of the object 518 and measure the distances between the opposite edges so as to determine the length 502 and height 504 of the object 518. Namely, the computing platform 104 identifies the leftmost edge 510 and the rightmost edge 512 to calculate the length 502; and the topmost edge 514 and the bottommost edge 516 to calculate the height 504. Finally, the computing platform 104 outputs the results.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle, comprising:
   a camera configured to capture an image of a forward path of the vehicle;
   a screen configured to display the image; and
   a processor, configured to, responsive to an input to the screen by a user drawing a line substantially enclosing an object displayed on the image, identify two edges outmost of the object, and measure a first distance between the two edges and output the first distance.

2. The system of claim 1, wherein the screen is a touch screen, and the processor is further configured to receive the input via the touch screen.

3. The system of claim 2, wherein the processor is further configured to:
   identify the two edges on the image by receiving two touch inputs defining two edge detection zones on the image; and
   detect edges of the image within the two edge detection zones.

4. The system of claim 2, wherein the processor is further configured to identify the two edges on the image responsive to receipt of touch input enclosing an object of the image.

5. The system of claim 1, wherein the processor is further configured to match orientations of the two edges to be substantially parallel.

6. The system of claim 1, wherein the processor is further configured to:
   compare the first distance measured between the two measuring edges with a preset value; and
   output a result of the comparison.

7. The system of claim 1, wherein the processor is further configured to receive the input from a mobile device wirelessly connected to the processor.

8. The system of claim 1, further comprising a distance sensor configured to detect at least one object and measure a depth between the distance sensor and the detected object.

9. The system of claim 8, wherein the processor is further configured to measure a second distance between the two edges using the depth detected by the distance sensor, and rectify the first distance and the second distance to obtain a final result distance.

10. The system of claim 9, wherein the distance sensor includes at least one of: an ultrasonic sensor; a radar sensor; or a lidar sensor.

11. The system of claim 1, wherein the processor is further configured to measure the closest two points between the two edges.

12. A method, comprising:
- displaying an image captured by a camera on a touch screen display;
- receiving an input including a line drawn to the touch screen display substantially enclosing at least one object of the image;
- identifying two edges outmost of at least one object opposite to each other displayed on the image captured by the camera;
- measuring a first depth between the camera and the at least one object; and
- calculating a first distance between the two edges using the first depth through image processing.

13. The method of claim 12, wherein the input is made to the touch screen display by two touch inputs at close proximities to the two edges to be identified.

14. The method of claim 13, further comprising:
- highlighting the identified edges on the touch screen display;
- displaying a segment simulating the distance measured between the edges on the display; and
- displaying the measured distance near the segment.

15. The method of claim 12, further comprising:
- measuring a second depth between a distance sensor and at least one of the object using the distance sensor;
- calculating a second distance between the two edges using the second depth; and
rectifying the first distance and the second distance to obtain a final result distance.

* * * * *